(12) United States Patent
Tanimura (10) Patent No.: US 7,716,526 B2
(45) Date of Patent: May 11, 2010

(54) INFORMATION PROCESSING APPARATUS, CONTROL APPARATUS THEREFOR, AND CONTROL METHOD THEREFOR

(75) Inventor: Yoichi Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 495 days.

(21) Appl. No.: 11/790,670

(22) Filed: Apr. 26, 2007

(65) Prior Publication Data

US 2008/0077823 A1 Mar. 27, 2008

(30) Foreign Application Priority Data

Sep. 27, 2006 (JP) ............................. 2006-263124

(51) Int. Cl.
*G06F 11/00* (2006.01)
(52) U.S. Cl. .............................. 714/25; 714/24; 714/36
(58) Field of Classification Search .................. 714/24, 714/25, 36
See application file for complete search history.

(56) References Cited

U.S. PATENT DOCUMENTS 6,467,054 B1 * 10/2002 Lenny ......................... 714/42
7,337,368 B2 * 2/2008 Wynn et al. .................. 714/42
2005/0210333 A1 * 9/2005 Allue et al. .................. 714/27
2006/0150016 A1 * 7/2006 Miller et al. ................. 714/25
2006/0184823 A1 * 8/2006 Matsuki et al. .............. 714/12

FOREIGN PATENT DOCUMENTS

JP 10-207733 8/1998
JP 2001-142839 5/2001

OTHER PUBLICATIONS

Korean Office Action issued on Oct. 23, 2008 in corresponding Korean Patent Application No. 10-2007-0046020.

* cited by examiner

*Primary Examiner*—Robert Beausoliel
*Assistant Examiner*—Charles Ehne
(74) *Attorney, Agent, or Firm*—Staas & Halsey LLP (57) ABSTRACT

An information processing apparatus carrying out hardware diagnosis processing by means of initializing processing of each part of hardware when power supply in the apparatus is started, has a power-off initializing processing part carrying out the hardware diagnosis processing when the power supply in the apparatus is cut off; and a power-off timing control part controlling timing of cutting off the power supply in the apparatus in such a manner that the power supply in the apparatus is carried out after the hardware diagnosis processing and trouble reporting processing carried out by said power-off initializing processing part are finished.

20 Claims, 10 Drawing Sheets

INFORMATION PROCESSING APPARATUS, CONTROL APPARATUS THEREFOR, AND CONTROL METHOD THEREFOR

CROSS REFERENCE TO RELATED APPLICATIONS

This application claims the benefit of Japanese Patent Application 2006-263124 filed Sep. 27, 2006, in the Japanese Patent Office, the disclosure of which is hereby incorporated by reference.

BACKGROUND OF THE INVENTION

1. Field of the Invention

The present invention relates to an information processing apparatus, a control apparatus therefor, a control method therefor and a control program for causing a computer to carry out the control method, and, in particular, to an information processing apparatus, a control apparatus therefor, a control method therefor and a control program for causing a computer to carry out the control method, for avoiding a situation that regular operation is obstructed, even when a trouble occurs in hardware in the information processing apparatus.

2. Description of the Related Art

For example, for a computer called a mainframe which is an information processing apparatus for carrying out information processing concerning ATM (i.e., automated-teller machines) of a bank or such, a situation that operation is interrupted should be avoided in view of the nature of the application field.

In such a kind of an information processing apparatus, during regular operation, when a trouble occurs in such a hardware component which is operated only during power supply starting processing, i.e., during system initializing processing and hardware diagnosis processing carried out therein, the trouble in the hardware component cannot be detected until the power supply starting is carried out. Specifically, for example, the trouble in the hardware component is detected when the information processing apparatus is once shutdown in a case where the operation of the information processing apparatus is stopped at the end or the year, and after that, the information processing apparatus is started up again at the beginning of the next year. In this case, the trouble in the hardware component is detected immediately before the beginning of the operation at the beginning of the year. Ordinarily, actual timing of starting of the power supply starting processing in the information processing apparatus is determined from the officially scheduled operation starting time in consideration of a time required for the system initializing processing. Therefore, when the trouble in the hardware component is detected during the power supply starting processing, and also, when a recovery from the trouble requires replacement of some defective components and thus requires a corresponding time, a problematic situation may occur. That is, the operation starting may not be achieved up to the above-mentioned officially scheduled operation starting time, or, in the worst case, system down may occur after the starting up of the system.

Figure 1:
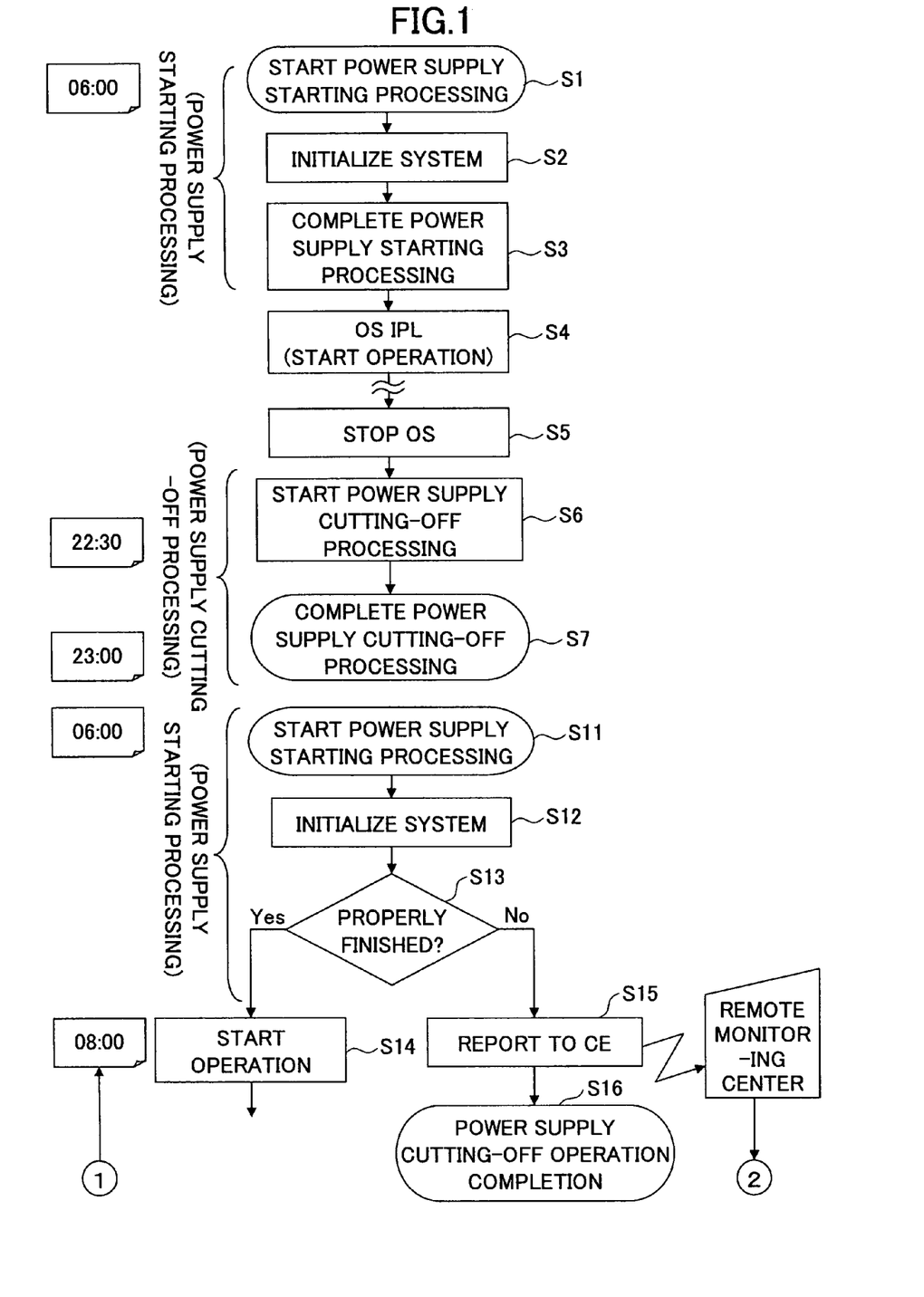
FIGS. 1 and 2 show an operation flow chart for illustrating a problem in the related art.
Figure 2:
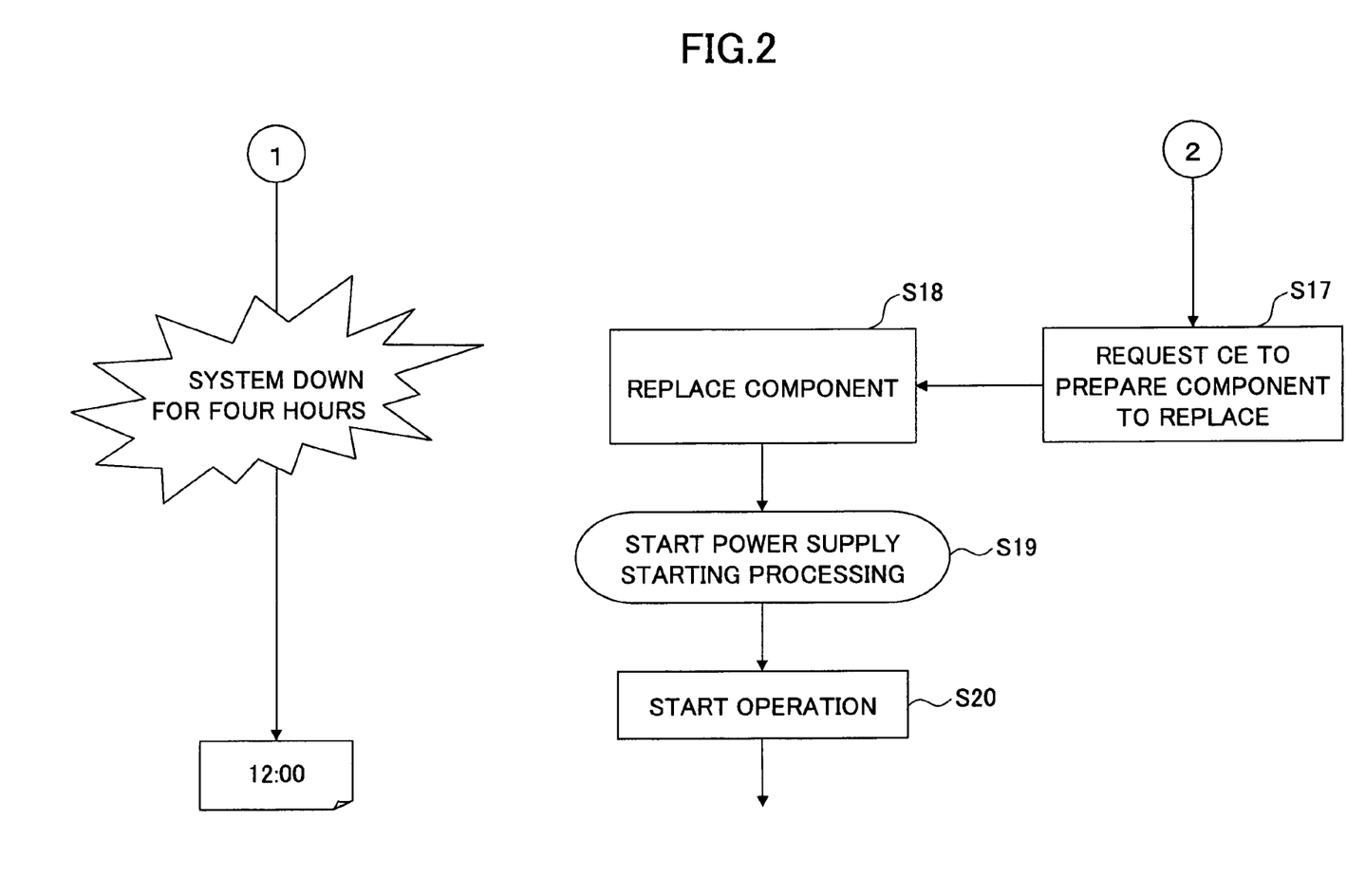

FIGS. 1 and 2 show an operation flow chart for illustrating the system initializing processing carried out when the power supply in the information processing apparatus is started, in the related art.

In FIG. 1, when power supply in the information processing apparatus is started in Step S1, the system initializing processing is carried out according to a predetermined procedure automatically in Step S2. When the system initializing processing is properly finished, the power sully starting processing is completed (Step S3).

After that, the OS (operating system) of the information processing apparatus, IPL (initial program loader) and so forth are stated up, and thus, operation of the information processing apparatus is started (Step S4).

Then, when the operation of the information processing apparatus is halted during a predetermined down period such as the end of the year or such, the OS and so forth are stopped (Step S5), predetermined power supply cutting-off processing is started (Step S6), and the operation of the information processing apparatus is terminated accordingly (Step S7).

Then, after an elapse of the down period, and thus, operation of the information processing apparatus is started again, the power supply starting processing is carried out (Step S11). Then, the same as the above, the system initializing processing is carried out (Step S12). Then, when the system initializing processing is properly finished (Yes in Step S13), the regular operation of the information processing apparatus is started (Step S14).

However, when a trouble is detected in the hardware during predetermined system diagnosis processing in the system initializing processing (No in Step S13), reporting to a CE (customer engineer) of a remote monitoring center is made (Step S15) for solving the problem. Further, in response to the detection of the hardware trouble, the power supply cutting-off processing is carried out in the information processing apparatus (Step S16).

When the reporting to the remote monitoring center is made in Step S15, the CE makes an appropriate arrangement to obtain necessary components for replacement (Step S17 of FIG. 2), and actually, a work of the replacement of the components is carried out (Step S18).

After that, the power supply starting processing in the information processing apparatus is carried out again, and operation of the information processing apparatus is started through the Steps S11 through S14 (Step S20).

It is assumed that the time at which the system operation is terminated after the power supply cutting-off processing is 23 o'clock night, and the officially scheduled time of system operation starting in the next day is 8 o'clock morning. In this case, the power supply starting processing is started at 6 o'clock morning, for example, for positively achieving the above-mentioned starting of operation of 8 o'clock morning.

Then, when the hardware trouble is detected during the system initializing processing (Step S12) in the power supply starting processing, and a time is required for making the arrangement to obtain necessary replacement components for solving the problem (Step S17) requires a considerable time, starting of the regular operation of the system may not be achieved at the officially scheduled time, i.e., at 8 o'clock morning. As a result, actually, starting of the regular operation may be problematically delayed for 4 hours, for example, to 12 o'clock morning. Thus, according to the related art, it may be difficult to effectively reduce the system stop period.

Especially, some cases, an information processing apparatus used in a bank, for example, should be basically operated continuously during 24 hours, and the system operation can be stopped only several days or several hours at the end of the year through the beginning of the next year. In such a case, the time of starting the system operation after the system shutdown is strictly managed. Further, for a case where the system shutdown is available only once a year, for example, the power supply starting processing is actually carried out only once a year. In such a case, there are very few chances to actually detect such a trouble, which can be found out only during the system initializing processing. Therefore, when the operation starting time after the system shutdown is delayed as mentioned above, a problem, such as a stop of the function of the ATM in the bank, may occur.

Below, examples of troubles of hardware components which operate only during the system initializing processing in the power supply starting processing will be listed, in relation with corresponding error events unique to the power supply starting processing:

1) hardware operation mode register trouble: due to a failure in a register which is used to set a hardware operating mode;

2) clock tuning trouble: due to a failure in an EEPROM (electrical erasable and programmable ROM) for holding tuning data (phase adjusting data);

3) microprogram/setting file/clock tuning file storage medium trouble: due to a failure in a hard disk drive of an SVP (service processor)

The SVP means a control apparatus which is a special possessor having a function to monitor states and operation of an information processing apparatus, by means of a second CPU provided separately from a first CPU which carries out a basic function of the information processing apparatus. The SVP is provided especially for such an information processing apparatus as a mainframe or such which takes a relatively important role, to guarantee continuous operation of the information processing apparatus.

Japanese Laid-Open Patent Application No. 2001-142839 discloses an art which relates to the present invention.

SUMMARY OF THE INVENTION

The present invention has been devised in consideration of the above-mentioned problem, and, an object of the present invention is to provide an information processing apparatus, configured in such a manner as to avoid an operation stop, even when a hardware component trouble, which can be found out only during initializing processing in power supply starting processing occurs, a control apparatus therefor, a control method therefor and a program for causing a computer to carry out the control method.

In order to achieve the above-mentioned object, according to the present invention, system initializing processing is carried out when power supply in an information processing apparatus is cut off, and actual timing of power supply cutting off of the information processing apparatus is controlled in such a manner that the power supply in the information processing apparatus is cut off after hardware diagnosis processing and trouble reporting processing is finished.

As a result, such a hardware trouble, which is found out during the hardware diagnosis processing in the system initializing processing carried out when operation of the information processing apparatus is started in the related art, can be found out also upon stopping of the information processing apparatus, i.e., when cutting power supply.

As a result, even for a case where a time is required for a necessary arrangement to obtain components for replacement to solve a hardware trouble, the work can be carried out during the down period. Accordingly, it is possible to effectively avoid a problematic situation that system down occurs after the system operation is started due to the hardware trouble.

Thus, according to the present invention, an operation stop in the information processing apparatus, which may otherwise occur due to such a hardware trouble, which can be found out only when power supply is cut off, in the related art, can be effectively avoided.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENT

Below, an embodiment of the present invention will be described.

In the embodiment of the present invention, when power supply in an information processing apparatus is cut off, system initializing processing for carrying out diagnosis of operation of hardware is carried out. As a result, it is possible to rapidly detect a hardware trouble unique to the initializing processing, i.e., unique to power supply starting processing, if any. Further, thus, finding out of the trouble is made when the power supply in the information processing apparatus is cut off. Generally speaking, there are several hours or several days until the power supply in the information processing apparatus is again started according to a predetermined system operation officially schedule as mentioned above. Accordingly, it is possible to make an appropriate arrangement to obtain necessary components for replacement to solve the trouble. As a result, it is possible to avoid system down of the information processing apparatus otherwise occurring after actually starting the system operation.

It is noted that, in order to distinguish, from hardware diagnosis processing carried out when the power supply in the information processing apparatus is started also carried out in the related art, hardware diagnosis processing carried out when the power supply is cut off is referred to as 'power supply cutting-off diagnosis processing' hereinafter in the embodiment of the present invention.

In the power supply cutting-off diagnosis processing, all the items of the system initializing processing except processing to connect to an SSU (described below), among those carried out also in the related art when the power supply in the information processing apparatus is started, is carried out.

When a hardware trouble has been found out in the power supply cutting-off diagnosis processing, the trouble is reported to a remote monitoring center, then necessary arrangement is made to obtain components for replacement and the corresponding component replacement work is completed within the down period before the officially scheduled system operation starting time. As a result, it is possible to avoid the problematic situation that system down occurs after the starting of the system operation.

Further, it is necessary to prevent the above-mentioned reporting to the remote monitoring center from being incompletely carried out, as a result of the power supply in the information processing apparatus being cut off during the reporting error. For this purpose, a configuration is provided such that actual cutting off of the power supply in the information processing apparatus is carried out after the reporting error is completed. As a result, it is possible that the reporting to the remote monitoring center can be completed positively.

The above-mentioned SSU (system storage unit) is shared by a plurality of information processing apparatuses via a communication network. When power supply in one thereof is cut off, this information processing apparatus carries out processing to disconnect from the SSU. According to the embodiment of the present invention, the power supply cutting-off diagnosis processing is carried out after the disconnecting from the SSU is thus carried out. As a result, if the initializing processing completely the same as that carried out when the power supply in the information processing apparatus is started were carried out also in the power supply cutting-off diagnosis processing, the processing to connect to the SSU would be carried out there, which is included in the initializing processing carried out when the power supply in the information processing apparatus is started. Thus, the once disconnected SSU were again connected to the information processing apparatus accordingly. Furthermore, after the power supply cutting-off diagnosis processing, the power supply in the information processing apparatus would be cut off in a condition where the processing to disconnect from the SSU had not been carried out. As a result, the power supply in the information processing apparatus would be cut off problematically while the SSU would be kept connected to the information processing apparatus. In order to avoid such a problematic situation, it is preferable that the processing to connect to the SSU, i.e., a corresponding item of initializing processing for a component which is provided for connecting to the SSU is excluded from the power supply cutting-off diagnosis processing in the embodiment of the present invention.

The embodiment of the present invention has the following features:

1) Hardware diagnosis is carried out in the system initializing processing when power supply in the information processing apparatus is cut off. As a result, it is possible to rapidly detect a trouble if any, and thus, to positively achieve a recovery therefrom before the officially scheduled system operation starting time.

2) The above-mentioned system initializing processing is carried out in parallel to I/O (external interface circuit) power supply cutting-off processing. As a result, in comparison to the related art, it is possible to minimize an additionally required time required by additionally carrying out the system initializing processing when the power supply in the information processing apparatus is cut off.

3) Further, only when the system initializing processing carried out when the power supply in the information processing apparatus is started has been properly finished, the system initializing processing when the power supply in the information processing apparatus is cut off is then actually carried out. That is, when the system initializing processing carried out when the power supply is started has not be properly finished, a predetermined trouble reporting has been already made accordingly. If the system initializing processing were carried out also when the power supply in the information providing apparatus is cut off in this case, the system initializing processing would not properly be finished again, and as a result, the same trouble reporting would be again made to the remote monitoring center duplicately.

4) Further, a communication processing time (fixed value) is preferably provided for the above-mentioned trouble reporting to the remote monitoring center. Then, the power supply is cut off preferably after the elapse of the communication processing time. As a result, it is possible to positively ensure the necessary time required for the trouble reporting.

5) Further, for a case where the above-mentioned system initializing processing carried out when the power supply is cut off is not necessary for a case of, for example, a test run carried out before the actual operation of the information processing apparatus or such, predetermined setting information and a setting measure (i.e., user's operation on a predetermined page displayed on a display device) is preferably provided, for arbitrarily preventing the initializing processing otherwise carried out when the power supply in the information processing apparatus is cut off from being actually carried out. As a result, it is possible to arbitrarily omit actual execution of the system initializing processing otherwise carried out when the power supply in the information processing apparatus is cut off.

According to the embodiment of the present invention, it is possible to avoid possible system down otherwise occurring after the starting of system operation, by previously detecting a hardware trouble if any which would be otherwise detected when the power supply in the information processing apparatus is started for starting the system operation in the related art.

Next, a configuration of the embodiment of the present invention will be described in detail.

Figure 3:
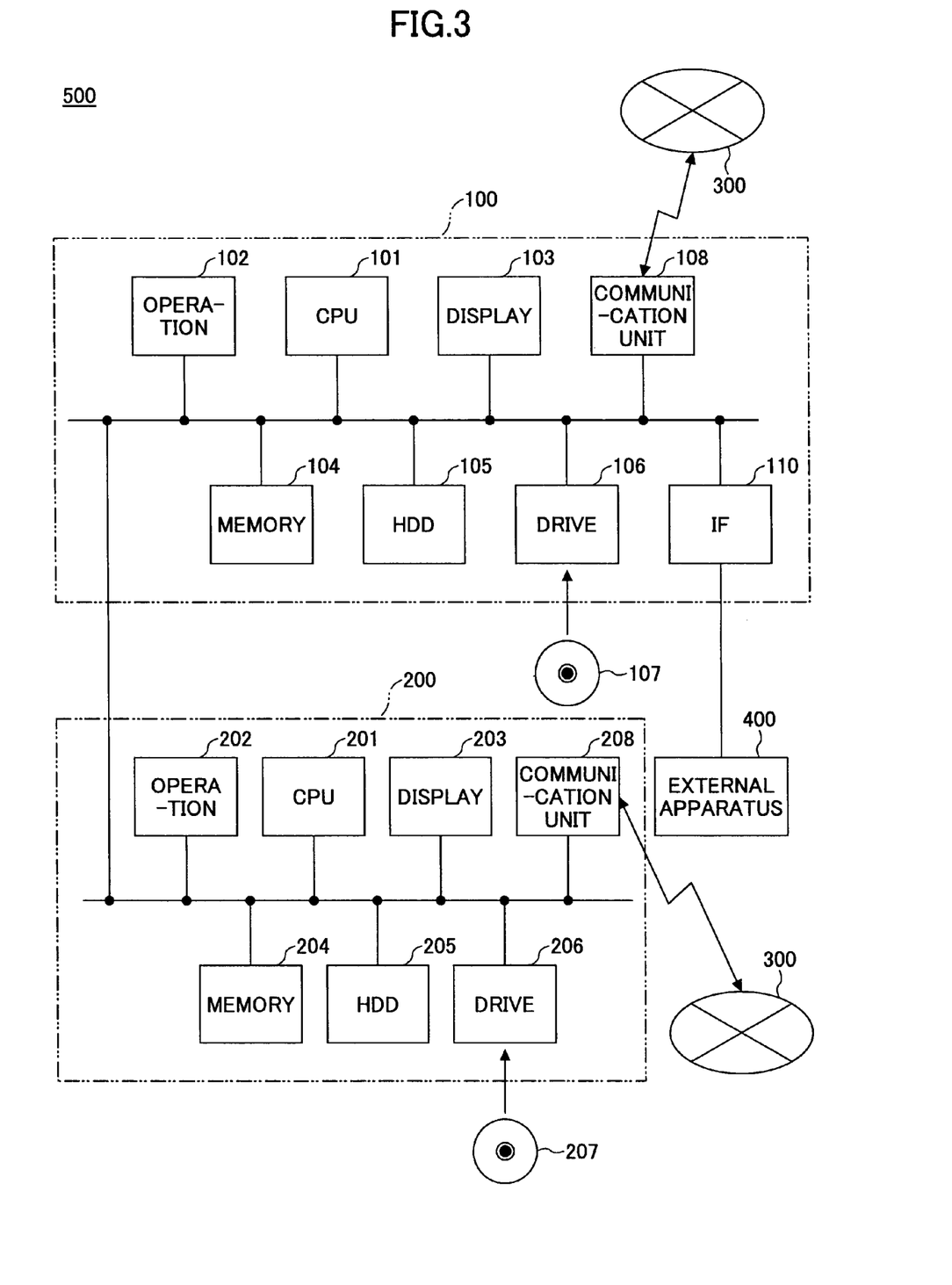
FIG. 3 shows an example of a hardware configuration of an information processing apparatus (server) in one embodiment of the present invention.

FIG. 3 shows a block diagram of a hardware configuration in example of a server 500 in the embodiment of the present invention.

As shown in FIG. 3, the server 500 includes a body system 100 and a SVP sub-system 200.

The body system 100 is a processor part carrying out a basic function of the server 500. For example, the body system 100 carries out an information processing function concerning bank processing, the ATM and so forth. On the other hand, the SVP sub-system 200 is another processor part for monitoring and controlling operation of the body system 100 so as to guarantee that the body system 100 properly carries out the predetermined operation such as that corresponding to the above-mentioned basic function.

The body system 100 includes a CPU 101 for carrying out various operations by executing instructions written in a given program; an input part 102 such as a keyboard, a mouse, and so forth, for a user to input operation contents or data; a display part 103 such as a CRT, a liquid crystal display device or such, for displaying, to the user, a processing progress, a processing result or such of the CPU 101; a memory 104 such as a ROM, a RAM and so forth, for storing the program to be executed by the CPU 101, or to be used as a work area of the CPU 101; a hard disk drive 105 for storing the program, data and so forth; a CD-ROM drive 106 for loading the program or data from the outside with the use of a CD-ROM 107 as an information recording medium; a communication unit 108 for carrying out communication with an external server via a communication network 300 such as the Intent, LAN, WAN or such, and an external interface circuit 110 for inputting/outputting signals from/to an external apparatus 400.

Similarly, the SVP sub-system 200 includes a CPU 201 for carrying out various operations by executing instructions written in a given program; an input part 202 such as a keyboard, a mouse, and so forth, for a user to input operation contents or data; a display part 203 such as a CRT, a liquid crystal display device or such, for displaying, to the user, a processing progress, a processing result or such of the CPU 201; a memory 204 such as a ROM, a RAM and so forth, for storing the program to be executed by the CPU 201, or to be used as a work area of the CPU 201; a hard disk drive 205 for storing the program, data and so forth; a CD-ROM drive 206 for loading the program or data from the outside with the use of a CD-ROM 207 as an information recording medium; and a communication unit 208 for carrying out communication with an external server via a communication network 300 such as the Intent, LAN, WAN or such.

The SVP sub-system 200 loads or downloads a program including instructions for the CPU 201 to carry out a control method for an information processing apparatus in the embodiment of the present invention, described later with reference to FIGS. 4 through 10, via the CD-ROM 207, or via the communication network 300. Then, the program is installed in the hard disk drive 205, is appropriately loaded in the memory 204 therefrom, and, is executed by the CPU 201. As a result, the control method for the information processing apparatus in the embodiment of the present invention is realized.

Figure 4:
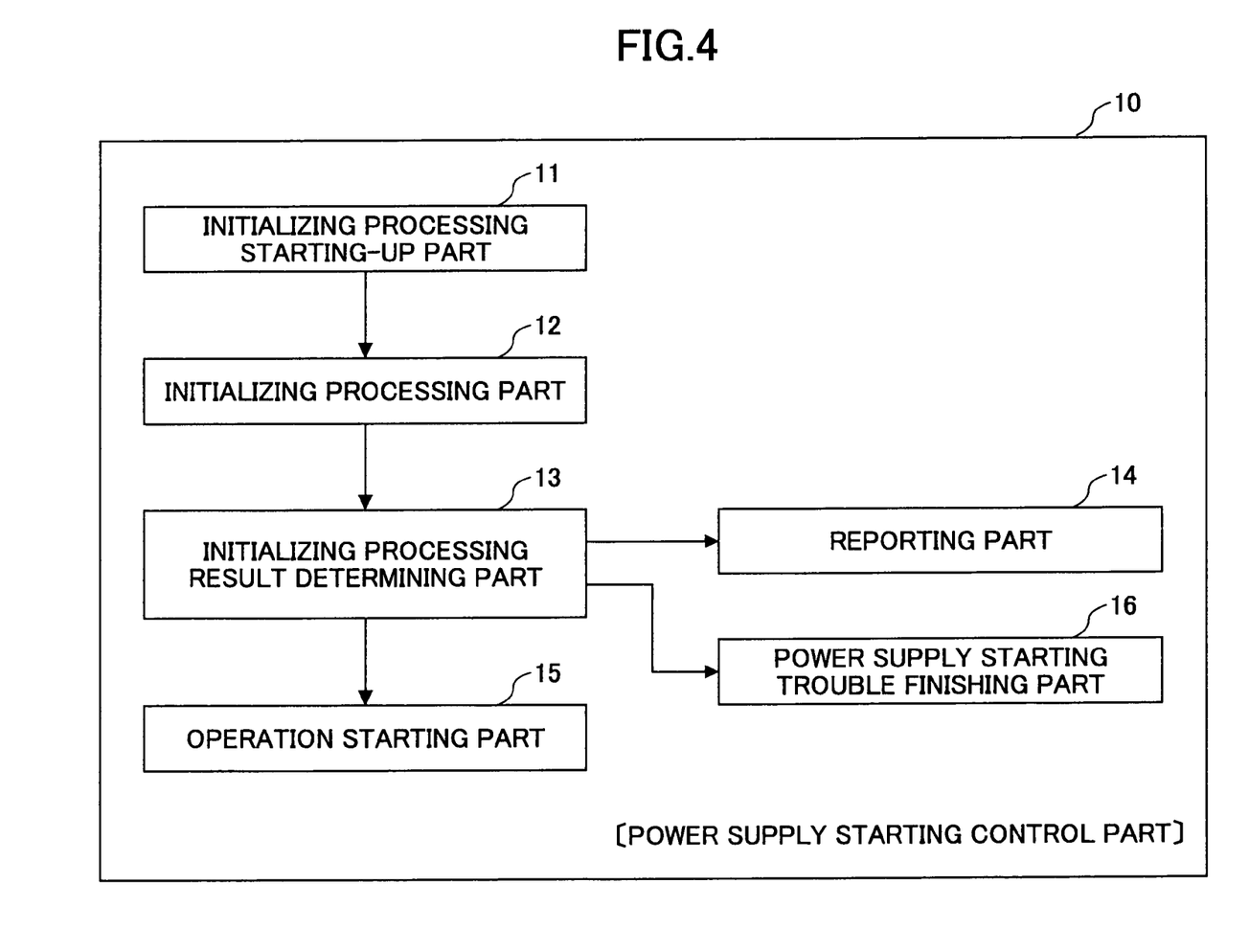
FIG. 4 shows a functional block diagram for illustrating a power supply starting function of an SVP sub-system shown in FIG. 3.
Figure 5:
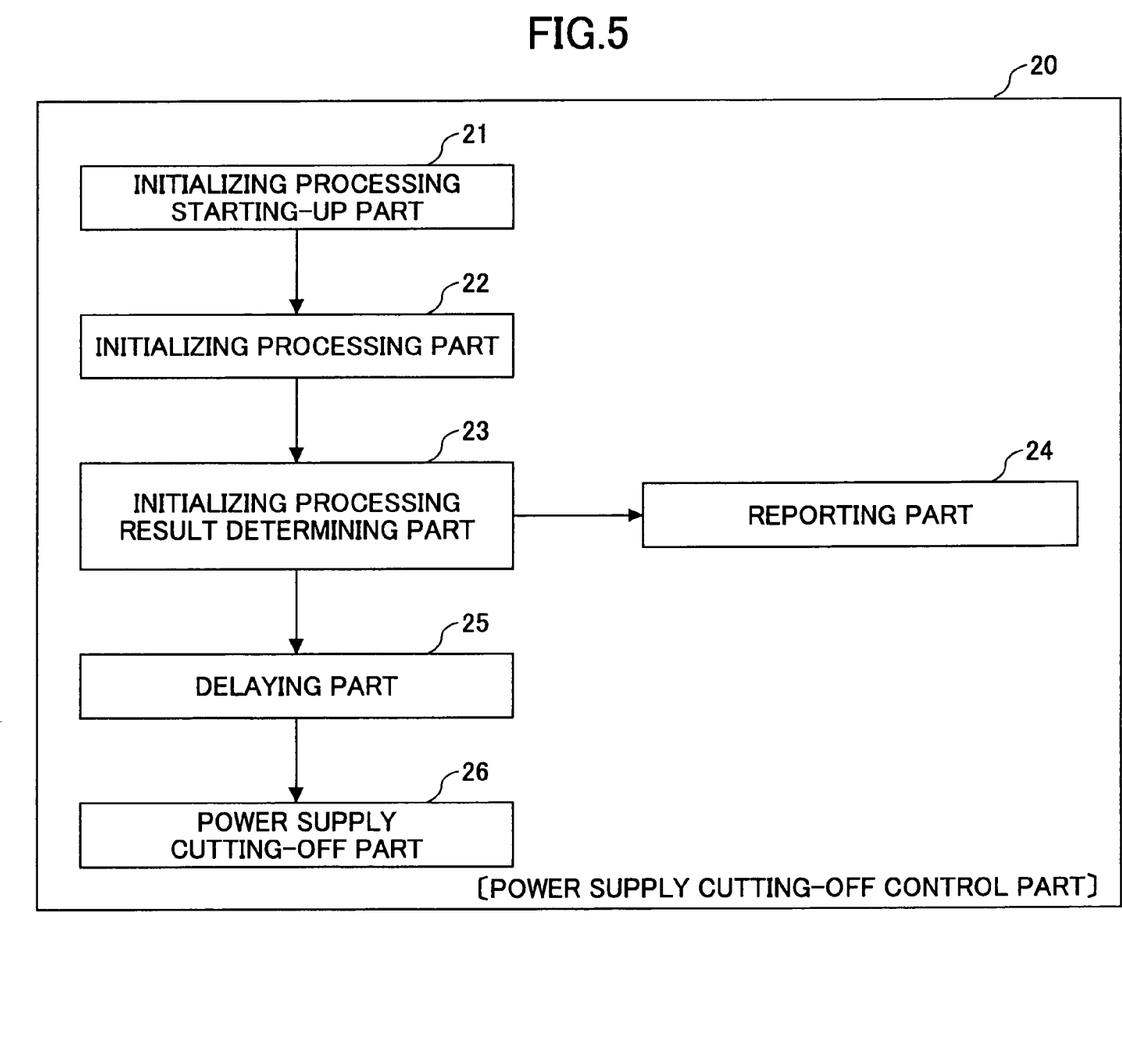
FIG. 5 shows a functional block diagram for illustrating a power supply cutting-off function of the SVP sub-system shown in FIG. 3.

FIG. 4 shows a block diagram of a power supply starting control part 10 as a functional block of the SVP sub-system 200; and FIG. 5 shows a block diagram of a power supply cutting-off control part 20 which is another functional block of the SVP sub-system 200. The functions of the power supply starting control part 10 and the power supply cutting-off control part 20 are executed by the CPU 201 according to the program.

The power supply starting control part 10 includes an initializing processing starting-up part 11, an initializing processing part 12, an initializing processing result determining part 13, a reporting part 14, an operation starting part 15 and a power supply starting trouble finishing part 16.

The initializing processing starting-up part 11 receives a predetermined apparatus power supply starting instruction externally, and starts up predetermined system initializing processing. The initializing processing part 12 executes the system initializing processing including initializing diagnosis (described later with reference to FIG. 9) according to an instruction of the initializing processing starting-up part 11.

The initializing processing result determining part 13 determines whether or not the system initializing processing executed by the initializing processing part 12 has been properly finished. When, as a result of the determination of the initializing processing result determining part 13, it is determined that the initializing processing has not been properly finished, and a trouble has been detected, the reporting part 14 reports to the CE of the remote monitoring center that the trouble has occurred. It is noted that the reporting part 14 may also have a function to report to the remote monitoring center that the initializing processing has been properly finished for the corresponding case. Further, when the initializing processing result determining part 13 has detected the trouble, the power supply starting trouble finishing part 16 finishes the server 500 with the trouble. This means that the server 500 finishes its operation due to the trouble situation, and does not necessarily mean that the power supply in the server 500 is cut off. Accordingly, in this case, the server 500 may finish its operation in a condition where the power supply is kept alive.

The operation starting part 15 outputs such an instruction to the body system 100 for starting predetermined regular operation, when the result of the determination of the initializing processing result determining part 13 indicates that the initializing processing has been properly finished.

The power supply cutting-off control part 20 shown in FIG. 5 has an initializing processing starting-up part 21, an initializing processing part 22, an initializing processing result determining part 23, a reporting part 24, a delay part 25 and a power supply cutting-off part 26.

The initializing processing part 21 receives a predetermined apparatus power supply starting instruction externally, and starts up predetermined system initializing processing. The initializing processing part 22 executes system initializing processing (described later with reference to FIG. 9; and, in this case, as mentioned above, the system initializing processing excluding the processing to connect to the SSU) according to an instruction of the initializing processing starting-up part 21.

The initializing processing result determining part 23 determines whether or not the system initializing processing executed by the initializing processing part 12 has been properly finished.

When, as a result of the determination of the initializing processing result determining part 23, it is determined that the initializing processing has not been properly finished, and a trouble has been detected, the reporting part 24 reports to the CE of the remote monitoring center that the trouble has occurred.

The power supply cutting-off part 26 cuts off core power supply in the server 500, i.e., cuts off power supply to respective parts, i.e., the CPUs 101, 201, the memories 104, 204 and so forth, except the external interface circuit 110, in the server 500 described above with reference to FIG. 3, after the initializing processing result determining part 23 has outputs the determination result, or, further after an elapse of a predetermined delay time provided by the delay part when the reporting part 24 has carried out the above-mentioned reporting processing.

The power supply cutting-off part 26 carries out processing to cut-off power supply in the external interface circuit 110 in parallel to the system initializing processing carried out by the system initializing processing part 22.

The delay part 25 delays the power supply cutting-off processing carried out by the power supply cutting-off part 26 for such a time during which the above-mentioned reporting processing carried out by the reporting part 24 can be positively completed. As a result, the reporting part 24 can positively carry out the reporting processing without being interrupted due to the cutting-off of the power supply.

Next, with reference to FIGS. 6 through 8, a flow of operation carried out by the SVP sub-system 200 will be described.

When the SVP sub-system 200 receives the predetermined apparatus power supply starting instruction externally, the power supply starting processing is started up by the power supply starting control part 10 (Step S31). It is noted that, in the present embodiment, it is assumed that the power supply starting processing is started at 6 o'clock morning. Then, the initializing processing starting-up part 11 starts up the system initializing processing, and the initializing processing part 12 actually executes the system initializing processing (Step S32).

Then, the initializing processing result determining part 13 determines whether or not the system initializing processing has been properly finished (Step S33). When a trouble has been detected in the system initializing processing as a result of the determination (No), a predetermined initializing state flag which the initializing processing result determining part 13 has is set in a 'failure' state (Step S34). Then, as mentioned above, the reporting part 14 carries out the reporting processing, and also, the power supply starting trouble finishing part 16 carries out predetermined trouble finish processing (Step S34A).

On the other hand, when the determination result of the initializing processing result determining part 13 indicates that the system initializing processing has been finished properly (Yes in Step S33), the above-mentioned initializing state flag is set in a 'success' state (Step S35), and the power supply starting is completed. Then the operation starting part 15 provides such an instruction that the body system 100 starts the regular operation. The body system 100 which thus receives this instruction starts up the OS (operating system), IPL (initial program loader) and so forth, and starts the regular operation, i.e., for example, information processing concerning the ATM of the bank (Step S37).

Next, when the predetermined apparatus power supply cutting-off instruction is received externally during the regular operation of the server 500, the OS of the body system 100 is stopped (Step S38), the power supply cutting-off control part 20 in the SVP sub-system 200 starts the power supply cutting-off processing (Step S39). In the power supply cutting-off processing, predetermined system lock-out processing, SSU disconnecting processing and so forth are executed (Step S40).

Next, the initializing processing starting-up part 22 of the power supply curing-off control part 20 determines, before actually starting up of the predetermined system initializing processing (in this case, excluding the processing to connect to the SSU), whether or not predetermined hardware diagnosis setting (described later) is effective (Step S42). Further, the power supply cutting-off part 26 starts the power supply cutting-off processing for cutting power supply in the external interface circuit 110 (Step S41).

The above-mentioned hardware diagnosis setting means setting information for arbitrarily making ineffective the system initializing processing in the power supply cutting-off processing, for such a case of the test run carried out before actually starting the regular operation of the server 500, or such. This setting is carried out by the CE. For example, from a page such as that shown in FIG. 10 displayed on the display screen of the display device 203 of the SVP sub-system 200, a predetermined item, i.e., a 'IDIAG AT SYSTEM POWER STAND-BY' item is set 'D', whereby the system initializing processing is skipped in the power supply cutting-off processing.

When this hardware diagnosis setting information is set as 'D', that is, such setting that the system initializing processing is skipped in the power supply cutting-off processing is made, the determination result of Step S42 becomes No, the system initializing processing is thus skipped. Then, the power supply cutting-off part 26 executes the power supply cutting-off processing as mentioned above. That is, the core power supply of the server 500, i.e., as mentioned above, the power supply in the respective parts, i.e., the CPUs 101, 201, the memories 104, 204, and so forth, is cut off (Step S41A), and thus, the power supply cutting-off processing is completed with the completion of the power supply cutting-off processing of the external interface circuit 110 (Step S41) mentioned above.

On the other hand, when the hardware diagnosis setting is set as 'E' in the determination of Step S42, that is, when the setting such that the system initializing processing is carried out in the power supply cutting-off processing is made, the determination result of Step S42 becomes Yes. In this case, the initializing processing starting-up part 21 reads the above-mentioned initializing state flag, to determine whether or not the system initializing processing in the power supply starting has been succeeded in (Step S44). As a result, when it is determined that 'success' indicating that the initializing processing in the power supply starting has been properly finished in the power supply starting processing is set in the initializing state flag (i.e., Step S35 of FIG. 6, and then, Yes in Step S44 of FIG. 7), the initializing processing part 22 executes the system initializing processing (Step S45). However, in this case, the system initializing processing except the processing to connect to the SSU is executed, as mentioned above.

On the other hand, when 'failure' is set in the initializing state flag (No in Step S44), this means that the trouble has been detected in the system initializing processing in the power supply starting as mentioned above (i.e., Step S34 of FIG. 6), the system initializing processing should not be carried out again as mentioned above. Accordingly, the system initializing processing is skipped, and, the same as the above, the core power supply of the server 500, i.e., the power supply in the respective parts, i.e., the CPUs 101, 201, the memories 104, 204, and so forth, is cut off (Step S41A), and thus, the power supply cutting-off processing is completed with the completion of the power supply cutting-off processing of the external interface circuit 110 (Step S41).

After the system initializing processing in Step S45 is finished, the initializing processing result determining part 23 determines whether or not the system initializing processing has been properly finished. When a trouble is detected as a result of the determination (No in Step S46), that is, when a CPU operation mode register trouble, for example, has been detected, the reporting part 24 of the power supply cutting-off control part 20 carries out reporting to the CE of the remote monitoring center (Step S47). Further, the delay part 25 of the power supply cutting-off control part 20 delays the power supply cutting processing carried out by the power supply cutting-off part 26 for such a predetermined time during which the above-mentioned reporting processing of the reporting part 24 (Step S48) can be positively completed. As a result, the reporting processing can be positively carried out without being interrupted due to cutting off of the power supply.

The power supply cutting-off part 26 cuts off the above-mentioned core power supply of the server 500 (Step S41A), after the initializing processing determining part 23 has outputted the determination result in Step S46, or, further after the elapse of the predetermined delay time for the above-mentioned reporting processing carried out by the reporting part 24 in Steps S47 and S48. Then, the power supply cutting-off operation is completed (Step S43) with the completion of the power supply cutting-off processing of the external interface circuit 110 (Step S41).

Further, in response to the above-mentioned reporting to the remote monitoring center, the CE of the remote monitoring center makes a necessary arrangement to obtain necessary components to replace (Step S49). Therewith, the component replacement work is carried out in Step S50. After that, a necessary operation test with the power supply being started in the server 500 is carried out in Step S51. Then, the power supply cutting-off processing is carried out again in Step S52.

Figure 6:
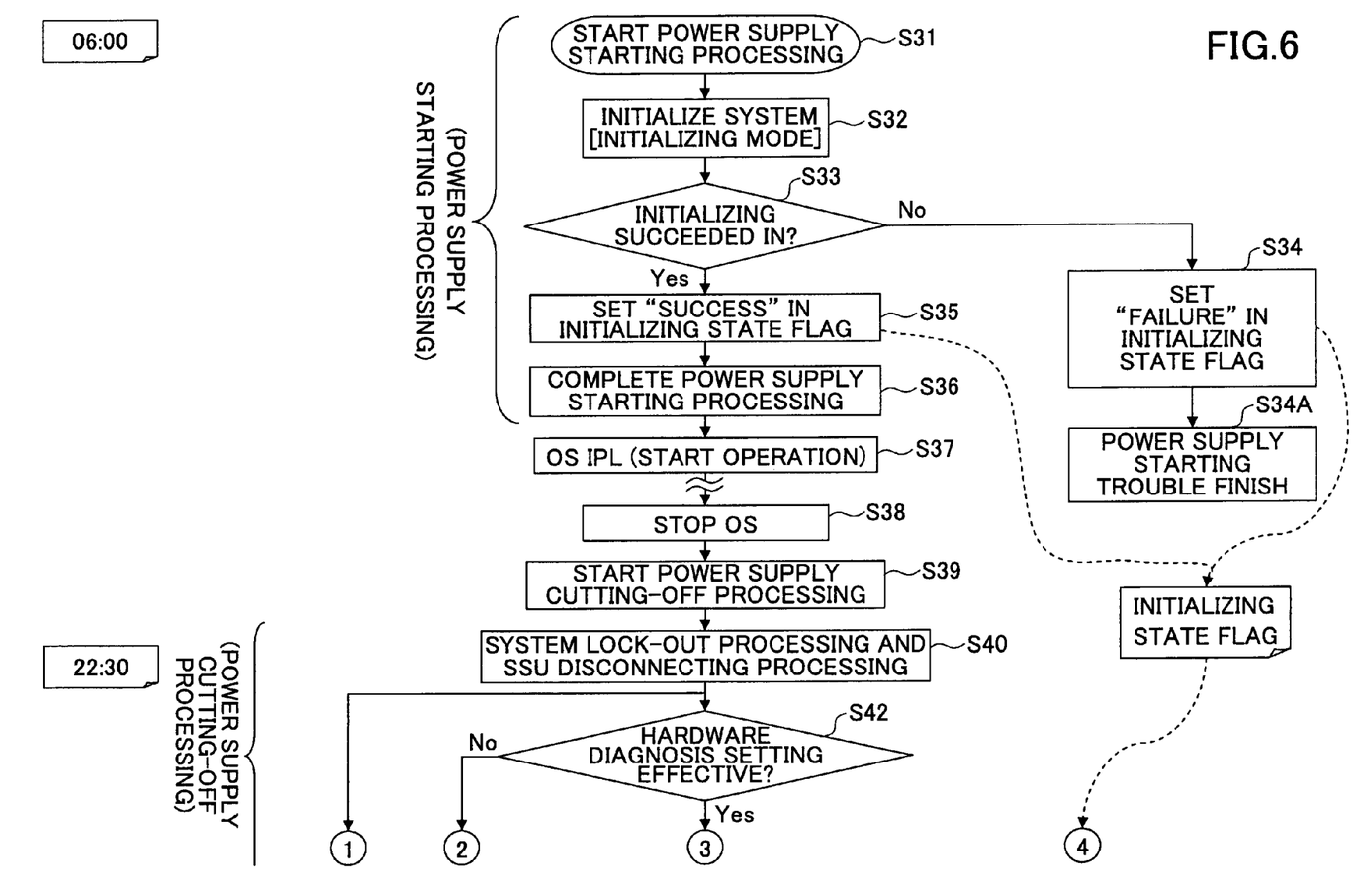
FIGS. 6, 7, 8 and 9 show operation flow charts for illustrating power supply starting/cutting-off operation of the SVP sub-system shown in FIG. 3.
Figure 7:
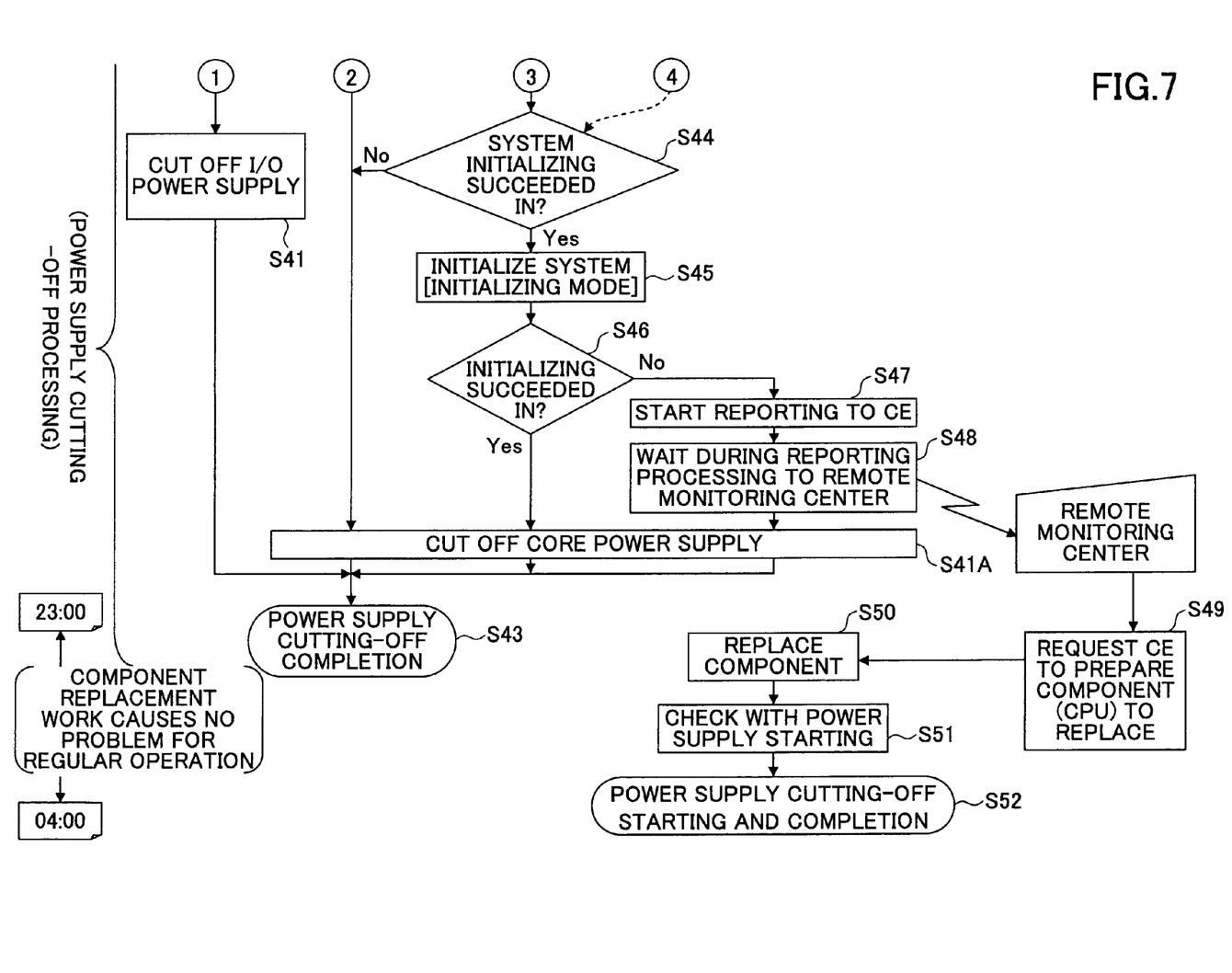
Figure 8:
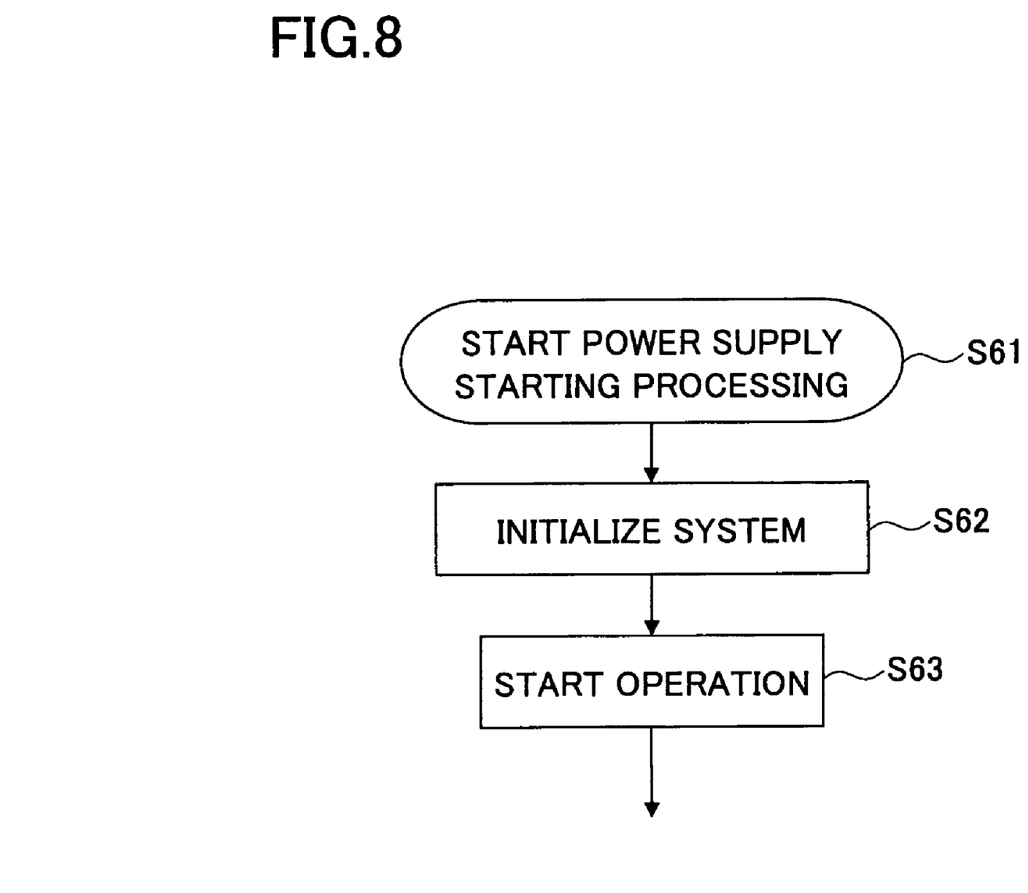

As shown in FIGS. 6 and 7, assuming that the power supply cutting-off processing of Step S39 is started at time of 22:30, even when five hours, for example, are required for making the above-mentioned arrangement to obtain the components to replace, the actual replacement work, the operation test after the replacement and then the power supply cutting-off processing again for the case where the trouble has been detected (No in Step S46) in the system initializing processing (Step S45), all the required works up to Step S52 can be finished by 4 o'clock morning of the next day. Accordingly, in the next day, the power supply is started at 6 o'clock (Step S61 of FIG. 8), the system initializing processing (Step S62) the same as that of Step S32 is then carried out, and thus, the system operation (regular operation) (Step S63) can be started after two hours, i.e., at 8 o'clock corresponding to the above-mentioned officially scheduled system starting time.

Thus, according to the present embodiment of the present invention, even when the hardwire trouble, which would be otherwise detected in the power supply starting processing in the related art, has occurred, this trouble is detected previously in the power supply cutting-off processing. Accordingly, the necessary time required for the necessary works, i.e., the arrangement of the components to replace, the actual replacement work, and then the operation verification can be ensured sufficiently before the officially scheduled operation starting time, and thus, it is possible to prevent the scheduled system operation from being obstructed.

Figure 9:
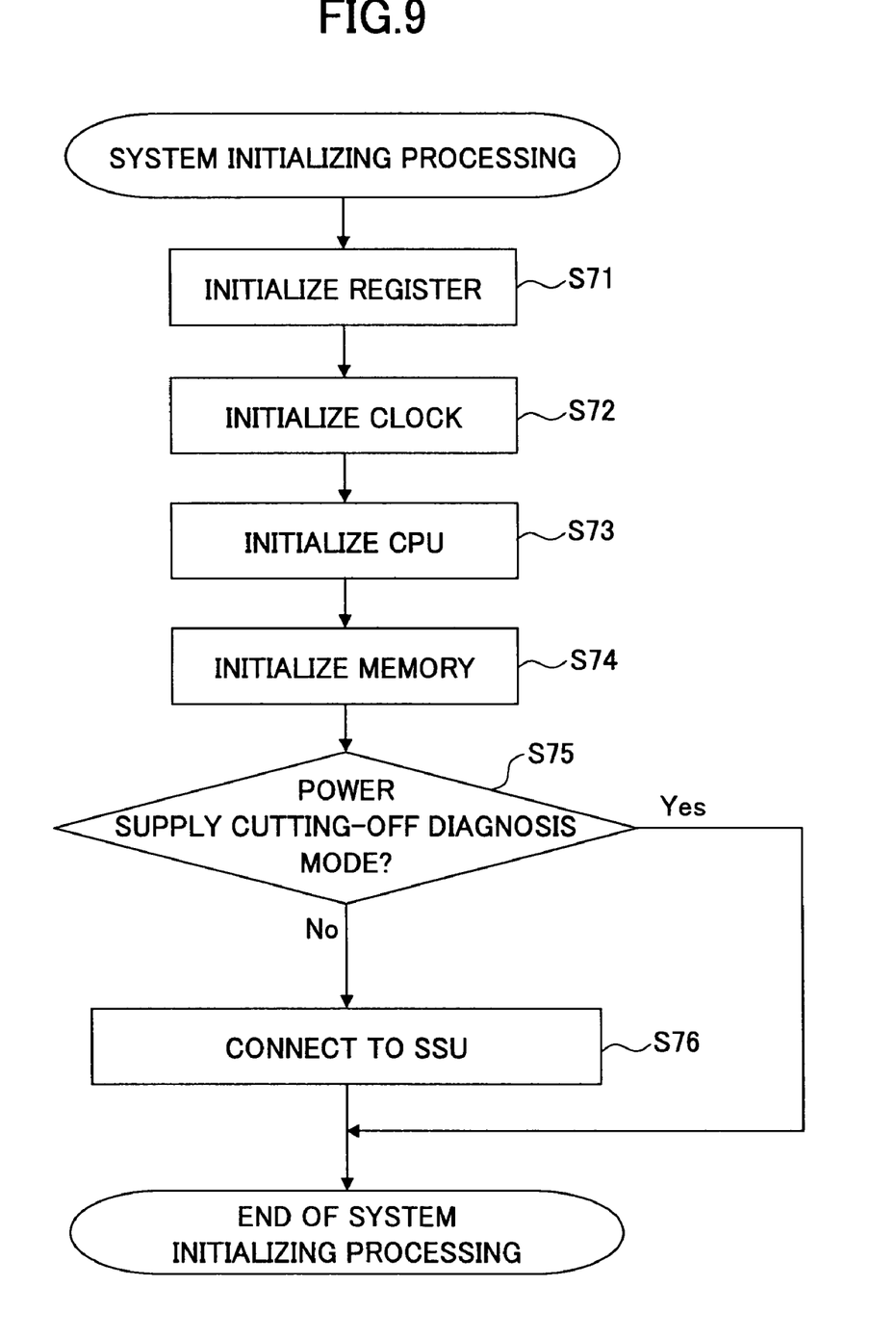
Figure 10:
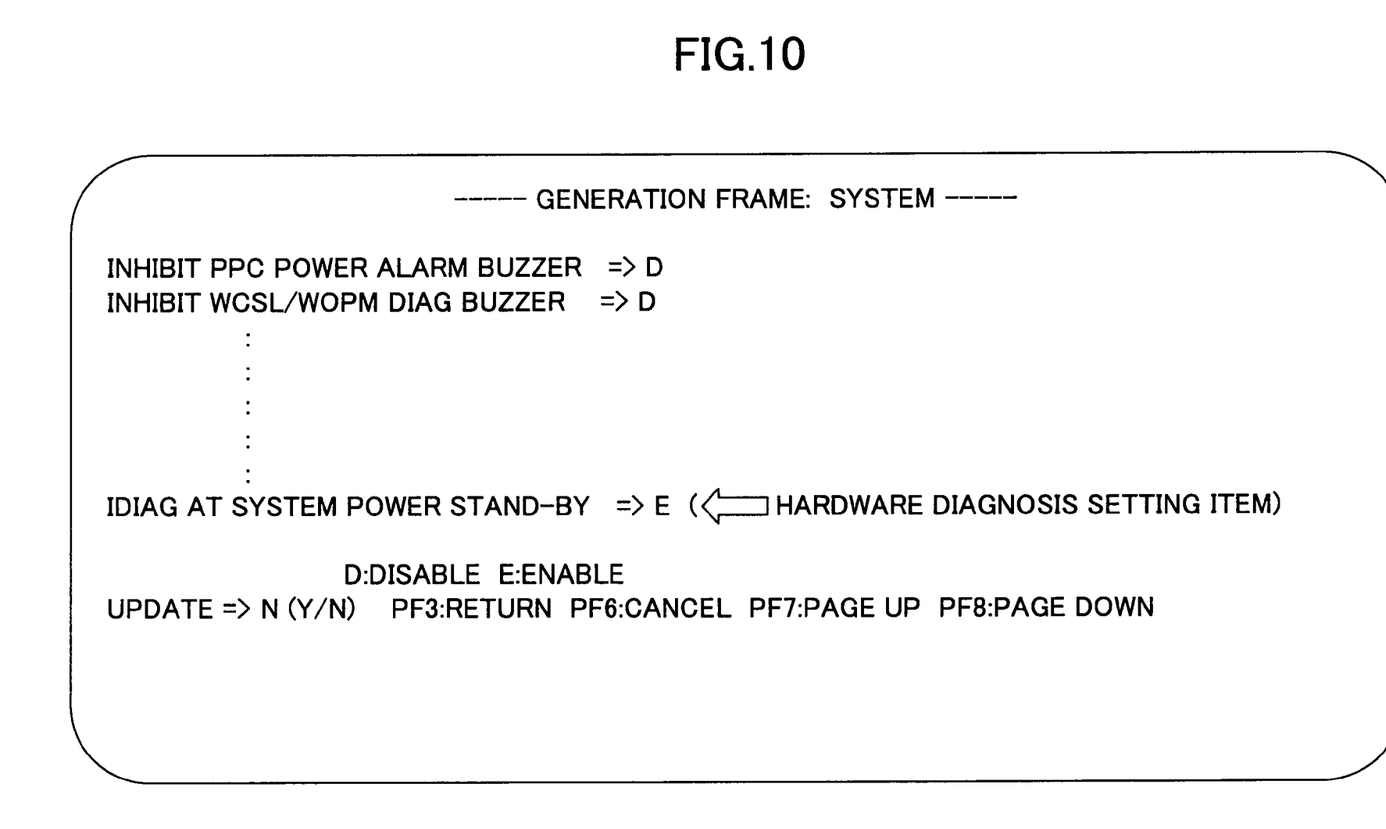
FIG. 10 shows an example of a configuration of a hardware diagnosis effective/ineffective setting page.

FIG. 9 shows an operation flow chart illustrating an operation flow of the above-mentioned system initializing processing (each of Steps S32, S45 and S65).

As shown in FIG. 9, in the above-mentioned system initializing processing, initializing of the hardware of the server 500, i.e., initializing of various registers (Step S72), initializing for various clock signals (Step S72), initializing of the CPUs 101 and 201 (Step S73), and initializing of the memories 104 and 204 (Step S74), are carried out in sequence, for example.

Then, in Step S75, it is determined whether the current initializing processing corresponds to the initializing processing which is carried out in the power supply starting processing (each of Steps S32 in FIG. 6 and S62 in FIG. 8) or the initializing processing which is carried out in the power supply cutting-off processing (Step S45 of FIG. 7, i.e., the above-mentioned 'power supply cutting-off diagnosis processing'). When the current initializing processing corresponds to the initializing processing carried out in the power supply cutting-off processing (Yes), the processing to connect to the SSU (Step S76) is skipped (Yes in Step S75), as mentioned above.

The present invention is not limited to the above-described embodiment, and variations and modifications may be made without departing from the basic concept of the present invention claimed below.

What is claimed is:

1. An information processing apparatus, comprising:
a power-start initializing processing part configured to carry out hardware diagnosis processing in initializing processing when power supply in the information processing apparatus is started;
a power-off initializing processing part configured to carry out the hardware diagnosis processing when the power supply in the information processing apparatus is cut off;
a power-off timing control part configured to control timing of cutting off of the power supply in the information processing apparatus in a manner in which cutting off of the power supply in the information processing apparatus is carried out after the hardware diagnosis processing carried out by the power-off initializing processing part and trouble reporting processing are finished; and
a reporting part configured to carry out the trouble reporting processing to report to a predetermined remote monitoring center when a trouble is found out as a result of the hardware diagnosis processing carried out when the power supply in the apparatus is cut off by said power-off initializing processing part, wherein:
the power-off timing control part delays the timing of cutting off of the power supply in the information processing apparatus for a time during which the reporting processing can be completed, when said reporting part carries out the trouble reporting processing.

2. The information processing apparatus as claimed in claim 1, wherein:
the power-off initializing processing part carries out the hardware diagnosis processing in parallel to processing of cutting off the power supply in an input/output part of the information processing apparatus.

3. The information processing apparatus as claimed in claim 1, wherein:
the power-off initializing processing part determines whether the hardware diagnosis processing, carried out when the power supply in the information processing apparatus has been started, has been properly finished, and, carries out the hardware diagnosis processing when the power supply in the information processing apparatus is cut off only when it is determined that the hardware diagnosis processing, carried out when the power supply in the information processing apparatus has been started, has been properly finished.

4. The information processing apparatus as claimed in claim 1, further comprising:
a setting operation part configured to make it possible to omit execution of the hardware diagnosis processing carried out when the power supply in the information processing apparatus is cut off by the power-off initializing processing part, as a result of an operator making a predetermined operation.

5. The information processing apparatus as claimed in claim 1, wherein:
the power-off initializing processing part is provided by a second control part, which is provided separately from a first control part configured to carry out a basic function of the information processing apparatus, the second control part configured to monitor states and operation of the information processing apparatus.

6. The information processing apparatus as claimed in claim 1, wherein:
a communication processing time for the trouble reporting processing is provided for when a trouble is detected in the hardware diagnosis processing, and the power-off timing control part cuts off the power supply in the information processing apparatus after the communication processing time elapses.

7. The information processing apparatus as claimed in claim 1, further comprising:
a part configured to omit the hardware diagnosis processing otherwise carried out when the power supply in the information processing apparatus is cut off.

8. A control apparatus configured to monitor states and operation of an information processing apparatus, comprising:
a power-start initializing processing part configured to carry out hardware diagnosis processing in initializing processing when power supply in the information processing apparatus is started;
a power-off initializing processing part configured to carry out the hardware diagnosis processing when the power supply in the information processing apparatus is cut off;
a power-off timing control part configured to control timing of cutting off of the power supply in the information processing apparatus in a manner in which cutting off of the power supply in the information processing apparatus is carried out after the hardware diagnosis processing carried out by the power-off initializing processing part and trouble reporting processing are finished; and a reporting part configured to carry out the trouble reporting processing to report to a predetermined remote monitoring center when a trouble is found out as a result of the hardware diagnosis processing carried out when the power supply in the information processing apparatus is cut off by said power-off initializing processing part, wherein:

the power-off timing control part delays the timing of cutting off of the power supply in the information processing apparatus for a time during which the trouble reporting processing can be completed, when said reporting part carries out the trouble reporting processing.

9. The control apparatus as claimed in claim 8, wherein:
the power-off initializing processing part carries out the hardware diagnosis processing in parallel to processing of cutting off of the power supply in an input/output part of the information processing apparatus.

10. The control apparatus as claimed in claim 8, wherein:
the power-off initializing processing part determines whether the hardware diagnosis processing, carried out when the power supply in the information processing apparatus has been started, has been properly finished, and, carries out the hardware diagnosis processing when the power supply in the information processing apparatus is cut off only when it is determined that the hardware diagnosis processing, carried out when the power supply in the information processing apparatus has been started, has been properly finished.

11. The control apparatus as claimed in claim 8, further comprising:
a setting operation part configured to make it possible to omit execution of the hardware diagnosis processing carried out when the power supply in the information processing apparatus is cut off by the power-off initializing processing part, as a result of an operator making a predetermined operation.

12. The control apparatus as claimed in claim 8, wherein:
a communication processing time for the trouble reporting processing is provided for when a trouble is detected in the hardware diagnosis processing, and the power-off timing control part cuts off the power supply in the information processing apparatus after the communication processing time elapses.

13. The control apparatus as claimed in claim 8, further comprising:
a part configured to omit the hardware diagnosis processing otherwise carried out when the power supply in the information processing apparatus is cut off.

14. A control method configured to monitor states and operation of an information processing apparatus, comprising:
carrying out hardware diagnosis processing in initializing processing when power supply in the information processing apparatus is started;
carrying out the hardware diagnosis processing when the power supply in the information processing apparatus is cut off;
controlling timing of cutting off of the power supply in the information processing apparatus in a manner in which cutting off of the power supply in the information processing apparatus is carried out after the hardware diagnosis processing in the carrying out the hardware diagnosis processing when the power supply in the information processing apparatus is cut off and trouble reporting processing are finished; and carrying out the trouble reporting processing to report to a predetermined remote monitoring center when a trouble is found out as a result of the hardware diagnosis processing carried out when the power supply in the apparatus is cut off in the carrying out the hardware diagnosis processing when the power supply in the information processing apparatus is cut off, wherein:

the controlling timing delays the timing of cutting off of the power supply in the information processing apparatus in a manner in which the trouble reporting processing can be completed, when the carrying out the trouble reporting processing carries out the trouble reporting processing.

15. The control method as claimed in claim 14, wherein:
the carrying out the hardware diagnosis processing when the power supply in the information processing apparatus is cut off carries out the hardware diagnosis processing in parallel to processing of cutting off the power supply in an input/output part of the information processing apparatus.

16. The control method as claimed in claim 14, wherein:
the carrying out the hardware diagnosis processing when the power supply in the information processing apparatus is cut off determines whether the hardware diagnosis processing, carried out when the power supply in the information processing apparatus has been started, has been properly finished, and, carries out the hardware diagnosis processing when the power supply in the information processing apparatus is cut off only when, as a result of the determination, it is determined that the hardware diagnosis processing, carried out when the power supply in the information processing apparatus has been started, has been properly finished.

17. The control method as claimed in claim 14, further comprising:
making it possible to omit execution of the hardware diagnosis processing otherwise carried out when the power supply in the apparatus is cut off in the carrying out the hardware diagnosis processing when the power supply in the information processing apparatus is cut off, as a result of an operator making a predetermined operation.

18. The control method as claimed in claim 14, wherein:
the carrying out the hardware diagnosis processing when the power supply in the information processing apparatus is cut off is executed by a second control part, which is provided separately from a first control part configured to carry out a basic function of the information processing apparatus, the second control part configured to monitor states and operation of the information processing apparatus.

19. The control method as claimed in claim 14, wherein:
a communication processing time for the trouble reporting processing is provided for when a trouble is detected in the hardware diagnosis processing, and the controlling timing cuts off the power supply in the information processing apparatus after the communication processing time elapses.

20. The control method as claimed in claim 14, further comprising:
omitting the hardware diagnosis processing otherwise carried out when the power supply in the information processing apparatus is cut off.

* * * * *